United States Patent [19]

Faulbecker et al.

[11] Patent Number: 5,769,723
[45] Date of Patent: Jun. 23, 1998

[54] CROSS MEMBER UNIT FOR UNIVERSAL JOINTS

[75] Inventors: Gerd Faulbecker, Hattingen; Manfred Meineke, Witten; Rolf Sedlmeier, Kamp-Lintfort, all of Germany

[73] Assignee: GKN Automotive AG, Lohmar, Germany

[21] Appl. No.: 736,022

[22] Filed: Oct. 22, 1996

[30] Foreign Application Priority Data

Jun. 5, 1996 [DE] Germany ......................... 196 22 446.2

[51] Int. Cl.[6] ...................................................... F16D 3/40
[52] U.S. Cl. .............................. 464/131; 277/152; 464/11
[58] Field of Search ............................. 464/131, 11, 128, 464/136; 277/152, 208

[56] References Cited

U.S. PATENT DOCUMENTS

| | | | |
|---|---|---|---|
| 2,996,901 | 8/1961 | Kleinschmidt | 464/131 |
| 3,906,746 | 9/1975 | Haines | 464/131 |
| 4,576,382 | 3/1986 | Scharting et al. | 277/152 X |
| 4,645,474 | 2/1987 | Olschewski et al. | 464/131 |
| 4,834,691 | 5/1989 | Schultze et al. | 277/152 X |
| 4,874,349 | 10/1989 | Gall | 464/131 X |
| 5,026,324 | 6/1991 | Schurger et al. | 464/131 |
| 5,407,387 | 4/1995 | Mazziotti et al. | 464/131 |
| 5,588,915 | 12/1996 | Smith | 464/131 X |
| 5,613,691 | 3/1997 | Komai et al. | 277/152 |

FOREIGN PATENT DOCUMENTS

| | | |
|---|---|---|
| GM-7116874 | 4/1970 | Germany . |
| 870529 U1 | 7/1987 | Germany . |
| 8714948 U1 | 2/1988 | Germany . |
| 3806397-C2 | 12/1989 | Germany . |
| 9014393 U1 | 2/1991 | Germany . |
| 55-14313 | 1/1980 | Japan . |

*Primary Examiner*—Daniel P. Stodola
*Assistant Examiner*—Emmanuel M. Marcelo
*Attorney, Agent, or Firm*—Harness, Dickey & Pierce, P.L.C.

[57] ABSTRACT

Cross member units for universal joints have a cross member (6) with four arms (17). Each two opposing arms define a common longitudinal axis (7). A bearing bush (9), covering the arm (17), is provided per arm (17). In the space between the casing (25) of the bearing bush (9) and the cylindrical running face (19) of the arm (17), rolling contact members (32) are arranged in the form of a rim. Towards the open end (30) of the bearing bush (9), a preseal (44) and main seal (37) are arranged between the arms (17) and the casing (25). To achieve a high running performance and a maintenance-free assembly for storing lubricating grease, the arms (17) include a storage chamber (20) which is open towards its end face (18) and otherwise closed. The chamber is tapered, starting from the end face (18). Furthermore, the main seal (37) is secured to the bearing bush (9) by means of an externally positioned carrier (39) which projects beyond the open end of the bearing bush (9). The outer face of the carrier (39) serves to contact one of two seals (51, 52) of the preseal (44). The other sealing lip serves to contact a stop face (31) at the open end (30) of the bearing bush (9). The main seal also includes two continuous sealing lips (38, 38') for sealing purposes.

7 Claims, 2 Drawing Sheets

CROSS MEMBER UNIT FOR UNIVERSAL JOINTS

BACKGROUND OF THE INVENTION

The invention relates to a cross member unit for universal joints. The cross member includes four arms, with two each defining a common longitudinal axis. A bearing bush is provided per arm. The bearing bush includes a casing, a base and an open end. The casing is arranged coaxially around a cylindrical running face of the associated arm at a distance therefrom. A ring of rolling contact members, in the form of rollers or needles which constitute a bearing means, is arranged on the space between the inner face of the casing and the running face. A preseal and a main seal are arranged towards the open end between the arm and the casing. A storage chamber is provided for lubricating grease. The preseal and main seal are formed, at least partially, of an elastomer material.

A cross member unit is described in EP 03 21 076. Here, the main seal is fixed to the inner face of the bearing bush by a metallic carrier. The seal has two sealing lips. One lip sealingly rests against a cylindrical sealing face of the cross member arm and the other lip rests against a conically extending sealing face of the cross member arm. Also, a preseal is provided in the form of an angle ring arranged on a cylindrical face of the arm. The cylindrical face adjoins the sealing face for the sealing lips of the main seal. The preseal extends over the outer face of the bearing bush via a leg which extends parallel to the inner face of the bearing bush. Together with an inwardly directed bead engaging a groove in the outer face of the bearing bush, the preseal forms a labyrinth seal. There is no friction contact between the bearing bush and the preseal. However, the preseal itself is positioned, through friction contact, on the associated seat portion of the arm of the cross member. Each arm has a lubricating bore with a stepped diameter. The lubricating bores of all arms of the cross member converge in the center of the cross member. In this region, a lubricating nipple is positioned for lubricating purposes. The lubricating bore portion with the largest diameter is positioned in the region of the running faces of the arm, which means that a certain quantity of lubricant is stored.

Thus, a relubricatable cross member unit is disclosed with a certain quantity of lubricant supplied through the lubricating nipple from time to time. Relubrication varies to the extent that grease emerges through the labyrinth gap of the preseal.

An improved embodiment of such sealing assemblies with a main seal and preseal for relubricatable cross member units is described in DE 88 05 833 U1. Here, the main seal is firmly inserted into the bearing bush. The seal is provided with two sealing lips which seal a cylindrical sealing face of the cross member. An annular portion includes a preseal which is arranged on a cylindrical portion to constitute an extension of the sealing face for the sealing lips of the main seal. The preseal is supported on a curved face if viewed in the axial direction of the arm. Furthermore, starting from the first leg used for fixing the preseal on the arm, the preseal has a second leg. The second leg is arranged at a radial distance with reference to the longitudinal axis and is connected to the first leg by a web. Also, the second leg externally extends over the bearing bush.

All the above embodiments are disadvantageous in that there is no defined seat for the preseal on the cross member arm. Thus, an increase in wear may occur and also leakages may occur. Furthermore, the embodiment according to the state of the art requires relubrication to ensure functioning of the sealing assembly over a longer period.

In the case of commercial vehicles, especially higher performance vehicles, an objective is to reduce maintenance periods to a minimum. Also, if possible, it is desirable to guarantee a predetermined maintenance-free service life which, in the case of commercial vehicles, amounts to approximately 1 million kilometers. In particular, this applies to vehicles with a permitted gross vehicle weight of more than 15 tons.

SUMMARY OF THE INVENTION

It is an object of the invention to provide a maintenance-free cross member unit for universal joints. This means that it does not include any relubricating facilities, but nevertheless guarantees a high running performance for vehicles with driveshafts, universal joints and cross member units.

In accordance with the invention, each arm includes a storage chamber to store lubricating grease. The chamber opens toward its end face and is otherwise closed. The storage chamber is tapered, starting from the end face. Each main seal includes an externally positioned carrier by which it engages the associated bearing bush. The carrier projects beyond the open end of the bearing bush. Each main seal also includes at least two sealing lips which project towards the associated arm. The lips are intended to contact the sealing face of the arm and extend around the arm. The sealing lips, while being directed away from the bearing bush, extend at an angle towards the arm. Each preseal includes a first leg which is firmly positioned on a seat face of the associated arm. A web extends transversely to the longitudinal axis and is followed by a second leg. The second leg extends toward the base of the bearing bush. A first sealing lip projects from the second leg to contact the bearing bush in the region of the open end. A second sealing lip extends at an angle towards the base of the bearing bush and is intended to contact the outer face of the carrier.

The inventive design and assembly of the main seal and preseal ensure that, during the period of service, lubricant loss is negligible. In particular, this is ensured by the additional seal of the preseal. The additional seal is intended to sealingly rest against the outer face of the carrier. The preseal with its two sealing lips prohibits dirt and moisture from the outside from penetrating into the sealed space between the main seal and preseal during both standard operation and, for example, when the vehicle and propeller shaft are cleaned by high pressure or steam jet. On the other hand, the preseal and main seal are designed in such a way that a small amount of lubricant is still permitted to emerge in an amount necessary to ensure proper functioning of the seals over a long period of time. A certain amount of lubricant must be permitted to emerge to lubricate the region on which the sealing lips rest in order to ensure dynamic sealing with little friction and little wear. However, the necessary amount of pretension is selected to achieve satisfactory sealing so as to prevent larger lubricant losses. Furthermore, the closed design of the storage chamber negates pressure build-up as in the case of conventional central lubricating channels. Such a pressure build-up could lead to an impermissibly large amount of lubricant pressed to the outside. Additionally, the shape of the storage chamber enables it to be completely filled when the bearing bush is slid onto the arm of the cross member. Excess quantity of lubricant is permitted to emerge through the main seal and preseal to provide for their lubrication. In this way it is ensured that all free spaces provided between the bearing bush, the arm and preseal are fully filled with grease. It has been found that the shape of the storage chamber enables it to be completely filled and at the same time, ensures a controlled lubricant exit which is necessary for desired running performance.

According to a further embodiment of the invention, the carrier, at its end projecting from the open end of the bearing bush, is provided with a collar. The collar enables the bearing bush with its accommodated rolling contact members, the main seal and preseal to be fit and subsequently slide jointly on to the arm. The collar is directed outwardly with reference to the longitudinal axis of the associated arm. The collar loads the preseal at the cams which are associated with its web portion, enclosed between its two legs, so as to be distributed around the longitudinal axis. Thus, the preseal, via its bore contour, is securely slid on to the seat face of the associated arm to ensure a firm fit.

To improve the firm fit of the preseal on the seat face of the arm, the preseal, at its inner face directed towards the seat face, includes a plurality of beads. At least one bead is intended to contact a cylindrical portion of the seat face. Towards the web of the preseal, the inner face is curved. The seat face of the arm includes a correspondingly curved portion. By providing the beads, it is possible to achieve a firm fit, thereby ensuring static sealing conditions between the preseal and arm. It is thus possible to achieve clearly defined conditions of movement. The relative movement between the bearing bush and arm is compensated for entirely by the sealing lips arranged at the second leg. In particular, by arranging the beads in the region of the cylindrical portion of the seat face it is ensured that the preseal remains in its position. Thus, no axial forces are generated in the direction of the longitudinal axis towards the bearing bush due to the pretension. In this way it is possible to ensure constant pretension conditions, especially at the sealing lip of the second leg of the preseal, sealing the stop face at the open end of the bearing bush.

In order to keep the main seal free from loads generated by the movement of the rolling contact members and furthermore, to provide a further labyrinth through which the lubricant has to pass, a stop disc is arranged between the rolling contact members and the main seal. The stop disc is supported on a shoulder away from the end face of the arm.

To increase lubricant volume and to improve lubricant distribution and to improve friction conditions, a sliding disc is arranged between the end face of the arm and its adjacent inner base face. The sliding disc includes a bore which is centered on the longitudinal axis. The bore diameter corresponds to at least that of the aperture of the storage chamber extending toward the end face of the arm.

A particularly advantageous embodiment of the storage chamber is achieved if the storage chamber includes a first bore portion in the form of a truncated cone tapered from the end face and of an adjoining second bore portion in the form of a cone.

BRIEF DESCRIPTION OF THE DRAWINGS

A preferred embodiment of the invention is diagrammatically illustrated in the drawing wherein.

DETAILED DESCRIPTION OF THE DRAWINGS

Figure 1:
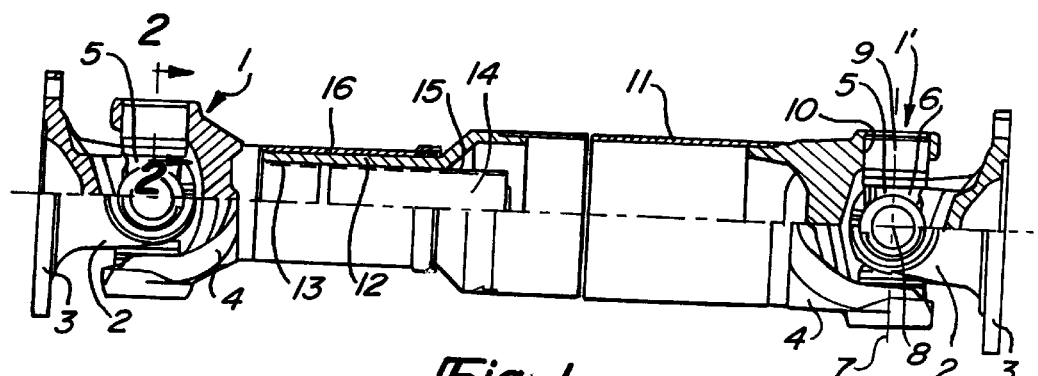
FIG. 1 is a cross-section view of half a section of a side elevation view of a driveshaft provided with universal joints.

FIG. 1 illustrates a driveshaft with the two universal joints 1, 1'. Each of the two universal joints 1, 1' includes a first joint yoke 2 provided with a flange 3. Furthermore, a second joint yoke 4 is provided per universal joint 1, 1'. Both joint yokes 2, 4 are connected to one another by a cross member unit 5. The first joint yoke 2 is able to carry out pivot movements around the longitudinal axis 8. The assembly of the first joint yoke 2 and the cross member unit 5 is able to carry out a pivot movement around the second longitudinal axis 7 relative to the second joint yoke 4. The cross member unit 5 includes a cross member 6 with four arms 17. Each arm includes a bearing assembly with a bearing bush 9 received in a yoke bore 10 of the respective joint yokes 2, 4.

A tube 11 is firmly connected to the second joint yoke 4 associated with the joint 1. The tube 11 carries the plunging sleeve 12 which includes a central bore, with splines 13 whose teeth extend parallel to the longitudinal axis and are worked into the wall of the central bore. A plunging journal 14 including splines 15 on its outside is longitudinally adjustably received in the central bore. The plunging journal 14 is firmly connected to the second joint yoke 4 of the universal joint 11.

The longitudinal plunging assembly includes the plunging journal 14 and the plunging sleeve 12. The plunging assembly 15 is able to accommodate changes in length which result from the change in the position of the universal-jointed shaft and thus from the articulation of the two universal joints 1, 1' relative to one another. The longitudinal plunging assembly is sealed by a protective tube 16. One end of the tube is secured to the second joint yoke 4 of the universal joint 1' and also covers the outer face of the plunging sleeve 12. The other end of the protective tube 16 includes a seal which has a sealing function relative to the outer face. The two flanges 3 connect with a driving and driven part of the driveline into which the universal-jointed shaft is inserted.

Figure 2:
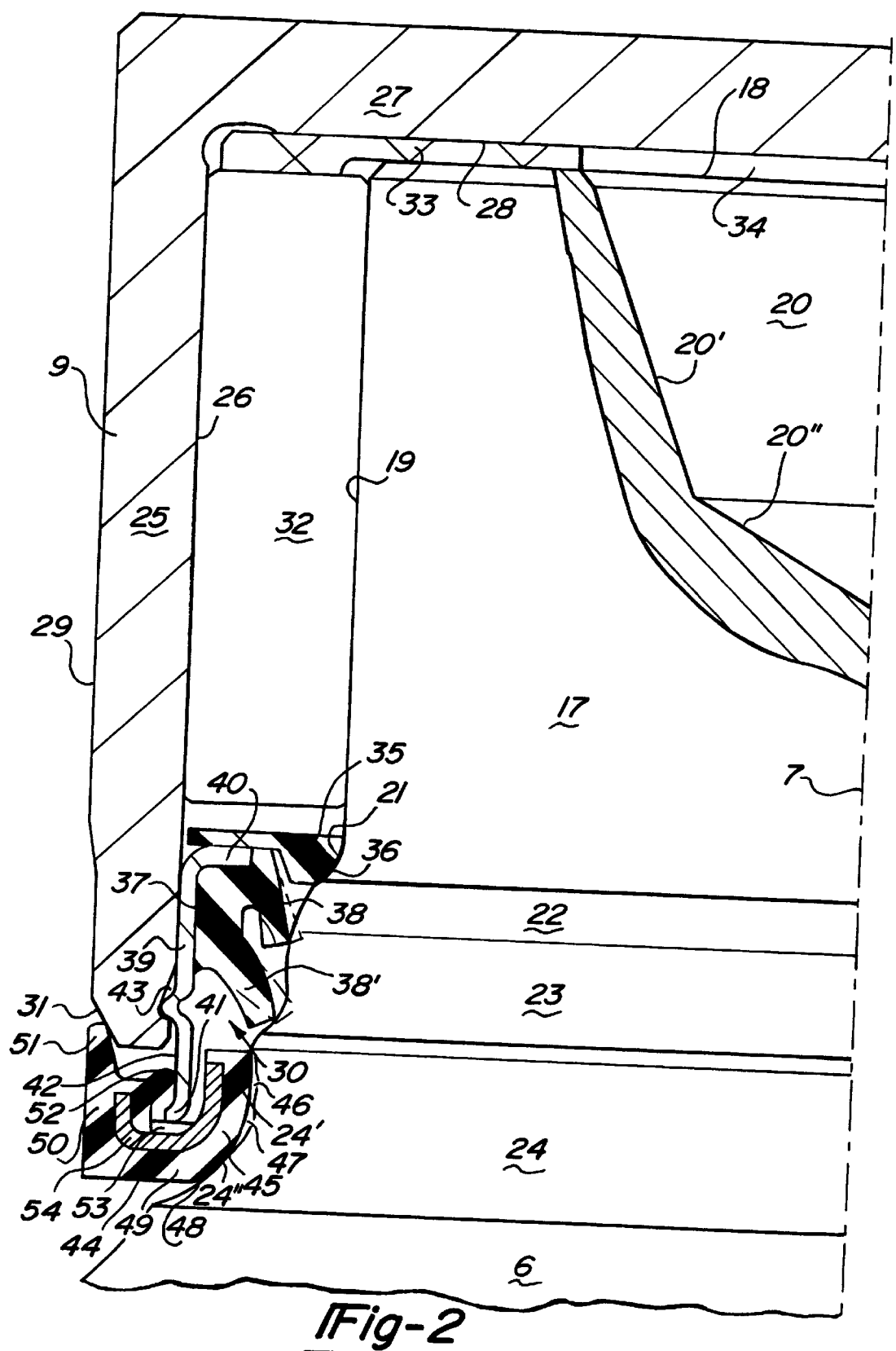
FIG. 2 is an enlarged partial cross-section view of a detail regarding the cross member unit, especially with reference to the design of the storage chamber and the arrangement and design of the seals.

FIG. 2 shows a detail of the cross member unit 5 in the form of half a section whose sectional plane contains the longitudinal axis 7. Part of the cross member 6 with the arm 17 is visible. The arm 17 includes an end face 18 and, starting from the end face, a cylindrical running face 19. A storage chamber 20, to accommodate lubricant, starts from the end face 18. The storage chamber includes a first bore portion 20' in the form of a truncated cone and an adjoining second bore portion 20" in the form of a conical bore which is centered on the longitudinal axis 7. This means that the storage chamber 20 includes its largest opening cross-section towards the end face 18.

The cylindrical running face 19, away from the end face 18, is followed by a shoulder 21 whose cross-section increases, starting from the cylindrical running face 19. The shoulder 21 has the shape of a curve and, in turn, it is followed by a conical face 22 which is adjoined by an approximately cylindrical sealing face 23. A continuous radius transition portion is provided between the shoulder 21 and the conical face 22, between the conical face 22 and the subsequent cylindrical sealing face 23 and the adjoining conical transitionary face. The transition portion reduces the notch effect, thus achieving improved strength conditions. The sealing face 23, by means of a conical transition, is followed by a seat face 24 which, towards the conical transition face, includes a cylindrical portion 24' and, starting therefrom, a curved portion 24".

A bearing bush 9 is placed on the arm 17. The bush 9 includes a casing 25 with a cylindrical inner face 26 and a cylindrical outer face 29. The cylindrical outer face 29 serves to accommodate the bearing bush 9 in the yoke bore 10 of a joint yoke. The bearing bush 9 has a base 27 whose inner base face has been given the reference number 28 and which covers the end face 18 of the arm 17. The other end of the bearing bush 9 constitutes the open end 30. The end face of the bush 9, in the region of the open end 30, is provided with a stop face 31, which extends conically.

A ring of rolling contact members 32 are positioned in the annular gap between the inner face 26 of the casing 25 of the bearing bush 9 and the cylindrical running face 19 of the arm 17. The rolling contact members 32 are in the form of needles or rollers. Towards the base 27 of the bearing bush 9, the rolling contact members 32 are supported on a sliding disc 33 arranged between the inner base face 28 and the end face 18.

The disc 33, with reference to the longitudinal axis 7, extends radially into the annular gap accommodating the rolling contact members 32. The sliding disc 33 includes a central bore 34 which is centered on the longitudinal axis 7. The bore 34 has a diameter which corresponds at least to the largest opening cross-section of the storage chamber 20 in the region of the end face 18. The sliding disc 33, via its face pointing to the inner base face 28, rests thereagainst in a planar way, it includes, towards the end face 18, a portion which is concentrated on the annular region around the bore 34 and by means of which it rests against the end face 18.

The movement of the rolling contact members 32 parallel to the longitudinal axis 7, away from the end face 18, is limited by the stop disc 35. The stop disc 35 includes a supporting bore 36 which rests against the shoulder 21 of the arm 17. The supporting bore 36 includes circumferentially distributed grooves, one of which is shown in FIG. 2. The groove enables the emergence of lubricant from the region of the annular gap accommodating the rolling contact members 32, in the direction of the main seal 37.

Along the longitudinal axis 7, the main seal 37 includes two sealing lips 38, 38' arranged one behind the other. The main seal 37 also includes a carrier 39. The carrier 39 is a metallic sleeve and, in the direction of the stop disc 35, includes a first collar 40 which extends radially inwardly towards the longitudinal axis 7. The main seal 37, via an outer face 42 of the carrier 39, is firmly inserted into the bore formed by the inner face 26 of the bearing bush 9. The part of the main seal 37, which has a sealing function and includes the sealing lips 38, 38', is made of an elastomer material which is firmly and non-removably connected to the carrier 39. The carrier 39 includes a portion 42 which projects axially beyond the open end 30 of the bearing bush 9. The end of the carrier 39 projecting from the bearing bush 9 includes a second collar 41 which extends radially outwardly away from the longitudinal axis 7. The main seal 37 may additionally be secured relative to the bearing bush 9 by formations which are arranged at the carrier 39 so as to be circumferentially distributed. By way of partial deformation, portions of the carrier 39 are deformed into a circumferentially extending groove 43 in the inner face 26 of the bearing bush 9. Furthermore, it can be seen that the sealing lips 38, 38', starting from the carrier 39, extend away from the end face 18 towards the conical face 22 and the sealing face 23.

Figure 3:
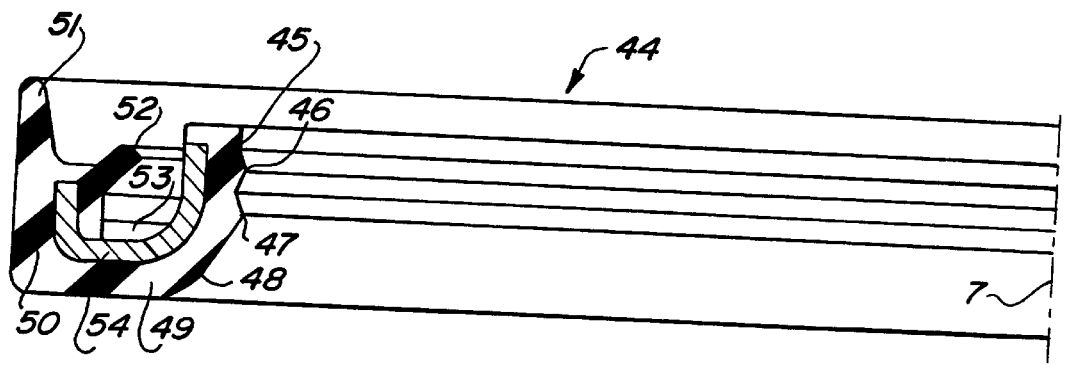
FIG. 3 is an enlarged detail of a cross-section view through a preseal.

A preseal 44 is arranged in front of the open end 30 of the bearing bush 9. In connection with the description of the preseal 44, reference is also made to FIG. 3. The preseal 44 includes a first leg 45 which includes a first bead 46 on its inner face. The first bead 46 extends continuously with reference to the longitudinal axis and cannot be seen in FIG. 2 in the fitted condition since the preseal 44 is pressed on to the arm 17. The seat face 24 with its two portions 24', 24", deformed the bead to such an extent that it is adapted to the cylindrical contour of the cylindrical portion 24. FIG. 3 shows the first bead 46 in its untensioned condition. The same applies to the second bead 47 which is positioned approximately in the region of transition between the cylindrical seat portion 24' and the curved portion 24". In FIG. 2, the untensioned condition, as resulting from FIG. 3, is shown in dashed lines.

The second bead 47 is followed by a curved portion 48 by which the first leg 45 of the preseal 44 is positioned on the corresponding curved portion 24" of the arm 17. The first leg 45 changes into a web 49 which extends substantially radially away from the longitudinal axis 7. At a radial distance from the first leg 45, the web 49 is followed by an outer second leg 50 which, at its end projecting towards the open end of the bearing bush 9, includes a first sealing lip 51. The sealing lip 51 is intended to rest against the conical stop face 31 of the bearing bush 9. It can also be seen that the first sealing lip 51 is pretensioned to rest against the stop face 31. The untensioned condition is indicated by dashed lines. The carrier 39 of the main seal 37 extends into the space between the two legs 45, 50 of the preseal 44. The second leg 50 of the preseal 44 is associated with a second sealing lip 52. The sealing lip 52 rests against the outer face 42 of the carrier 39 in a pretensioned condition. Again, the untensioned condition of the sealing lip 52 is indicated by dashed lines. Further, the annular space between the two legs 45, 50, towards the web 49, accommodates the preseal 44 with circumferentially distributed cams 53 positioned opposite the collar 41 of the carrier 39 of the main seal 37. When sliding the assembled unit of bearing bush 9 with sliding disc 33, rolling contact members 32, stop disc 35 and main seal 37 and the preseal 44 attached to the carrier 39 on to the arm 17, it is the function of the carrier 39, together with its collar 41, to ensure that the preseal 44 is pressed on to the seat face 24 in its accurate position without overloading the two sealing lips 51 and 52. The sealing lip 52 at the same time serves to hold the preseal 44 relative to the bearing bush 9 in a preassembled condition. This is due to the fact that the free opening cross-section of the sealing lip 52 in the assembled condition, when resting on the outer face 42, is smaller than the outer diameter of the collar 41. It can also be seen that the two sealing lips 51, 52 of the preseal are orientated towards the open end 30 and the base 27 of the bearing bush 9. Furthermore, the preseal 44 is provided with an insert 54 in the form of a metal reinforcement. The apertures in the region of the second collar 41 which enable the emergence of the lubricant are achieved by circumferential spaces between the cams, thus creating channels in front of the end face 18 of the collar 41.

When fitting the bearing bush 9 in the above-described unit, the rolling contact members 32 are inserted with a lubricant. Thus, the roller contact members 32 stick, so to speak, to the inner face 26 of the bearing bush 9. In addition, in the central region of the base 27, the region containing the bore 34 of the sliding disc 33, an accumulation of lubricant is provided. The bearing bush 9 is slid in the preassembled condition onto the arm 17. The accumulation of lubricant is pressed into the storage chamber 20. Since an excess amount of lubricant is present, lubricant additionally escapes through the gaps existing between the bearing bush 9 and arm 17. Lubricant passes into the region between the main seal 37 and preseal 44 and is able to pass their sealing lips 38, 38' and 51, 52, respectively, as a result of the above-described inclination of the sealing lips 38, 38', 51, 52 which permit the excessive amount of lubricant to emerge. In a similar way, the lips permit a small amount of lubricant to emerge during the service life of the cross member unit. In this way it is additionally ensured that cavities not containing any lubricant cannot form, that the lubricant is distributed uniformly and that even during the assembly operation, an excess pressure cannot be generated.

While the above detailed description describes the preferred embodiment of the present invention, the invention is susceptible to modification, variation and alteration without deviating from the scope and fair meaning of the subjoined claims.

We claim:

1. A cross member unit for universal joints comprising a cross member with four arms, two arms defining a common longitudinal axis;

a bearing bush provided per arm, said bearing bush including a casing, a base, and an open end with its casing being arranged coaxially around a cylindrical running face of the associated arm at a distance therefrom, a space is formed between the inner face of the casing and the running face;

a ring of rolling contact members in the form of rollers or needles constituting a bearing means is arranged in said space, a preseal and a main seal being arranged towards the open end between the arm and the casing, said preseal and main seal being at least partially of an elastomer and said main seal positioned within the bearing bush;

a storage chamber for storing lubricating grease on each arm, said storage chamber being tapered, starting from said end face;

each main seal including an externally positioned carrier having an outer face engaging with an interior surface of the associated bearing bush, said carrier projecting beyond the open end of the bearing bush, each main seal including at least two sealing lips projecting towards the associated arm, said lips for contacting a sealing face of the arm, and said lips extending around said arm, said lips, while being directed away from the bearing bush, extending at an angle towards the arm;

each preseal including a first leg firmly positioned on a seat face of the associated arm, said preseal including a web extending transversely to the longitudinal axis and a second leg extending toward the base of the bearing bush;

a first sealing lip projecting from said second leg contacting the bearing bush in the region of the open end, and a second sealing lip extending at an angle towards the base of the bearing bush contacting the outer face of the carrier that is projecting beyond the open end.

2. A cross member unit according to claim 1, wherein said carrier, at its end projecting from the open end of the bearing bush including a collar which is directed radially outwardly with respect to the longitudinal axis of the associated arm.

3. A cross member unit according to claim 1, wherein said preseal at the portion of its web enclosed between its two legs including cams which are distributed around the longitudinal axis.

4. A cross member unit according to claim 1, wherein said preseal, having an inner face directed towards the seal face of the arm, includes a plurality of beads which are spaced along the longitudinal axis, at least one contacting a cylindrical portion of the seat face and towards the web, if viewed in a cross-section, extends curve-like, and that the seat face is provided with a corresponding curved portion.

5. A cross member unit according to claim 1, wherein between the rolling contact members and the main seal a stop disc is arranged and away from the end face of the arm being supported against a shoulder of the arm.

6. A cross member unit according to claim 1, wherein a sliding disc is arranged between the end face of the arm and an adjacent inner face of the base, the sliding disc includes a bore which is centered on the longitudinal axis and has a diameter corresponding at least to that of an aperture of the storage chamber extending towards the end face of the arm.

7. A cross member unit according to claim 1, wherein said storage chamber includes a first bore portion in the form of a truncated cone tapered from the end face and an adjoining second bore portion in the form of a cone.

* * * * *

UNITED STATES PATENT AND TRADEMARK OFFICE
CERTIFICATE OF CORRECTION

PATENT NO. : 5,769,723
DATED : June 23, 1998
INVENTOR(S) : Gerd Faulbecker, Manfred Meineke, Rolf Sedlmeier It is certified that error appears in the above-identified patent and that said Letters Patent is hereby corrected as shown below:

Column 7, line 15, Claim 1, after "arms" (first occurrence), insert --each having an end face--

Signed and Sealed this

Fifth Day of January, 1999

Attest:

Attesting Officer

*Acting Commissioner of Patents and Trademarks*